(12) United States Patent
Tamane et al.

(10) Patent No.: US 10,530,501 B2
(45) Date of Patent: Jan. 7, 2020

(54) KEY UNIT, LOCKING/UNLOCKING SYSTEM, AND COMPUTER-READABLE STORAGE MEDIUM HAVING PROGRAM STORED THEREIN

(71) Applicants: Toyota Jidosha Kabushiki Kaisha, Toyota-shi Aichi-ken (JP); Nomura Research Institute, Ltd., Tokyo (JP); Kabushiki Kaisha Tokai Rika Denki Seisakusho, Niwa-Gun, Aichi (JP)

(72) Inventors: Yasuyuki Tamane, Miyoshi (JP); Tsukasa Takahashi, Tokyo (JP); Masaki Oshima, Aichi-ken (JP)

(73) Assignees: Toyota Jidosha Kabushiki Kaisha, Toyota-shi, Aichi-ken (JP); Nomura Research Institute, Ltd., Tokyo (JP); Kabushiki Kaisha Tokai Rika Denki Seisakusho, Niwa-gun, Aichi (JP)

( * ) Notice: Subject to any disclaimer, the term of this patent is extended or adjusted under 35 U.S.C. 154(b) by 0 days.

(21) Appl. No.: 16/108,709

(22) Filed: Aug. 22, 2018

(65) Prior Publication Data
US 2019/0123839 A1  Apr. 25, 2019

(30) Foreign Application Priority Data

Oct. 23, 2017 (JP) ................................. 2017-204750

(51) Int. Cl.
| | | |
|---|---|---|
| *H04B 17/27* | (2015.01) | |
| *H04B 17/11* | (2015.01) | |
| *H04B 17/318* | (2015.01) | |
| *H04B 17/345* | (2015.01) | |
| *G07C 9/00* | (2006.01) | |
| *H04B 17/23* | (2015.01) | |
| *H04B 17/24* | (2015.01) | |

(52) U.S. Cl.
CPC ......... *H04B 17/27* (2015.01); *G07C 9/00309* (2013.01); *H04B 17/11* (2015.01); *H04B 17/318* (2015.01); *H04B 17/345* (2015.01); *G07C 2009/00357* (2013.01); *H04B 17/23* (2015.01); *H04B 17/24* (2015.01)

(58) Field of Classification Search
CPC ................................. H04B 17/27; H04B 17/23
See application file for complete search history.

(56) References Cited

U.S. PATENT DOCUMENTS

| | | | |
|---|---|---|---|
| 8,417,258 B2 * | 4/2013 | Barnes, Jr. ......... | G06Q 10/1053 455/456.1 |
| 2004/0207510 A1 * | 10/2004 | Buchner ................ | B60R 25/24 340/5.61 |

FOREIGN PATENT DOCUMENTS

JP     2003-318809 A     11/2003

* cited by examiner

*Primary Examiner* — Tuan H Nguyen
(74) *Attorney, Agent, or Firm* — Dinsmore & Shohl LLP

(57) ABSTRACT

A key unit includes a control unit configured to control locking and unlocking of an object by performing radio communication with a locking/unlocking device. The key unit is configured to transmit a predetermined signal corresponding to whether a radio wave intensity in the radio communication with the locking/unlocking device is equal to or greater than a predetermined intensity to a mobile terminal. The predetermined signal is used to transmit a predetermined notification to a user when the predetermined signal is received by the mobile terminal.

8 Claims, 5 Drawing Sheets

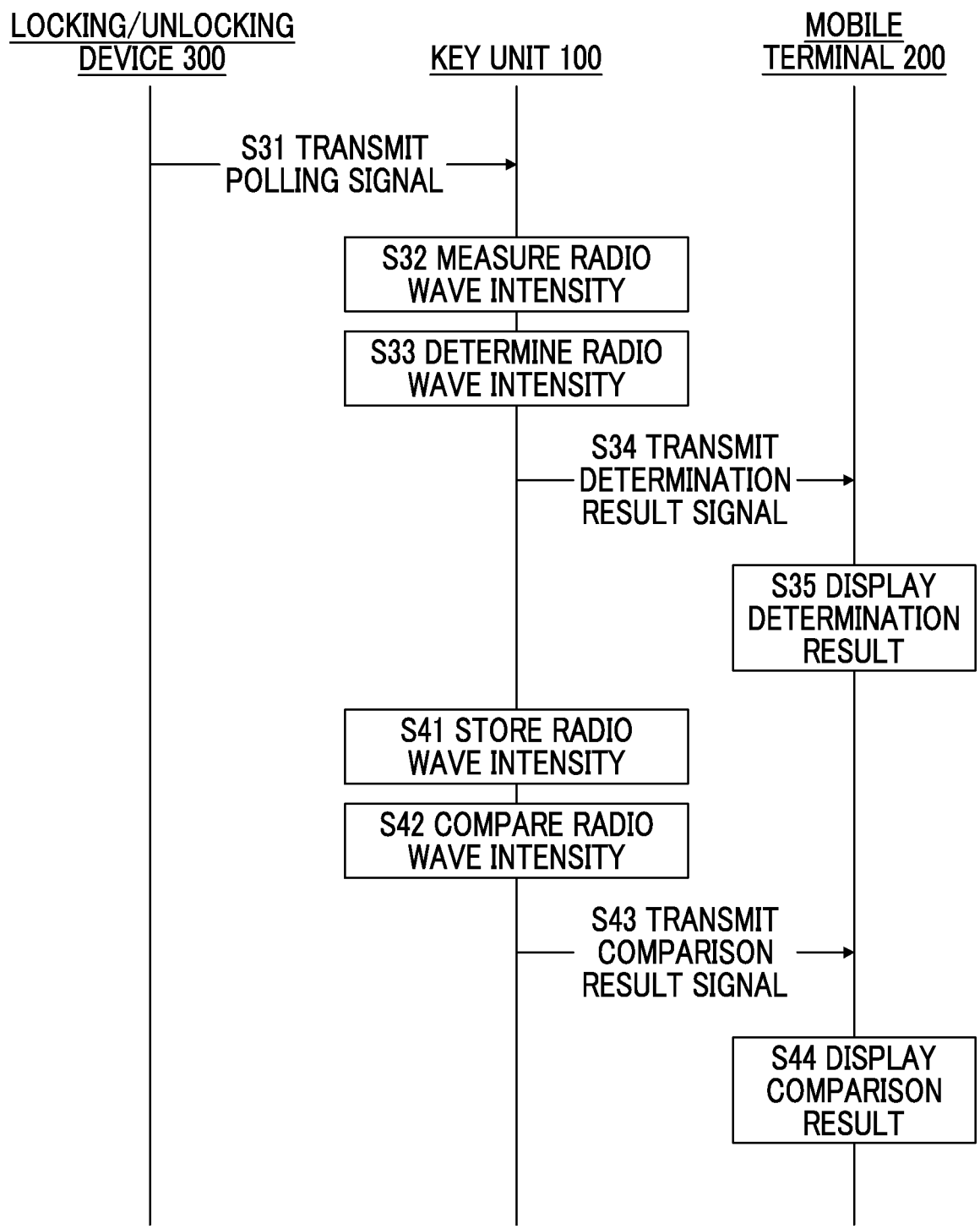

KEY UNIT, LOCKING/UNLOCKING SYSTEM, AND COMPUTER-READABLE STORAGE MEDIUM HAVING PROGRAM STORED THEREIN

CROSS-REFERENCE TO RELATED APPLICATIONS

This application claims priority to Japanese Patent Application No. 2017-204750 filed on Oct. 23, 2017, which is incorporated herein by reference in its entirety including the specification, drawings and abstract.

BACKGROUND

1. Technical Field

The disclosure relates to a key unit, a locking/unlocking system including the key unit, and a computer-readable storage medium having a program stored therein.

2. Description of Related Art

A configuration is which short-range radio communication between a BT transceiver and a mobile terminal is prohibited by stopping supply of electric power to a BT antenna with a low priority and thus reception of VICS (registered trademark) information from a radio signal in a VICS receiver with a high priority is secured when a current location of a host vehicle which is detected using a GPS receiver is in a communicable area of radio beacons is known (for example, see Japanese Unexamined Patent Application Publication No. 2603-318809 (JP 2003-318809 A)). Accordingly, radio wave interference between a plurality of radio communication devices of which operation frequencies are close to each other is curbed.

SUMMARY

Smart key systems are provided in vehicles that have been recently sold. A smart key system is a system that assigns a unique ID to a portable device (an electronic key) that performs radio communication with a vehicle and enables unlocking of a door or starting of an engine when an ID acquired by communication matches an ID registered in advance in the vehicle. Systems that enable locking and unlocking of a vehicle using a mobile terminal without alteration of the vehicle by using the systems have been studied.

For example, a key unit serving as an electronic key is installed in a vehicle and the electronic key is switched between validity and invalidity based on a result of authentication which has been performed by radio communication. By employing this configuration, locking and unlocking of a locking/unlocking device provided in a vehicle can be performed using a mobile terminal such as a smart phone. This technique can be used for locking and unlocking of a facility (a facility such as a conference room, a resort house, or a gymnasium) which is used at different times by a plurality of users, and convenience to users is improved by using the mobile terminal as an electronic key for a locking/unlocking device installed in the facility.

In such a smart key system, radio communication is performed between a key unity provided in a vehicle or a facility and a locking/unlocking device provided in the vehicle or the facility. For example, a smart key system installed in a vehicle uses radio waves of a long wavelength band for a transmission of a polling signal from the vehicle side and uses radio waves of an ultra-short wavelength band for a transmission of a response signal to the vehicle side. Since other communication devices transmitting radio waves or devices generating noise are present in the vehicle, radio wave interference can occur when a position at which the key unit is installed is not appropriate. As a result, there is a concern that it will be difficult to perform locking and unlocking using a mobile terminal. On the other hand, there is a concern that it will take time for a user to find a position which is more appropriate for an installation of the key unit.

The disclosure provides a key unit, a locking/unlocking system, and a computer-readable storage medium that can rapidly find a position which is appropriate as an installation position of a key unit that controls locking and unlocking of an object.

A key unit according to a first aspect of the disclosure includes a control unit configured to control locking and unlocking of an object by performing radio communication with a locking/unlocking device. The key unit is configured to transmit a predetermined signal corresponding to whether a radio wave intensity in the radio communication with the locking/unlocking device is equal to or greater than a predetermined intensity to a mobile terminal, the predetermined signal being used to transmit a predetermined notification to a user when the predetermined signal is received by the mobile terminal.

The predetermined intensity mentioned herein refers to a radio wave intensity that can secure minimum communication quality even when communication between the key unit and the locking/unlocking device is affected by noise. The predetermined intensity may be set to a lower limit value of a radio wave intensity with which the key unit and the locking/unlocking device can communicate with each other or may be set to a radio wave intensity obtained by adding a certain margin to the lower limit value. The predetermined signal may be a signal indicating whether a position at which the key unit is located is appropriate as an installation position of the key unit. When the predetermined signal is received by the mobile terminal, the mobile terminal informs the user of a predetermined notification corresponding to the predetermined signal. Accordingly, the predetermined signal may be a signal for causing the mobile terminal to inform of the predetermined notification corresponding to whether the radio wave intensity in the radio communication is equal to or greater than the predetermined intensity. The predetermined notification is a notification which is used to notify the user of whether the radio wave intensity in the radio communication is equal to or greater than a predetermined intensity. The user can immediately determine whether the position at which the key unit is located is appropriate as an installation position of the key unit based on the notification from the mobile terminal. Accordingly, it is possible to more rapidly find a position which is appropriate as an installation position of the key unit.

In the aspect, the predetermined signal may be a signal for displaying a predetermined image corresponding to whether the radio wave intensity in the radio communication is equal to or greater than the predetermined intensity on a screen of the mobile terminal. By causing the key unit to transmit such a signal, a predetermined image is displayed on the mobile terminal, and the user can perform determination based on the image. The predetermined image includes an image displaying whether a current position is appropriate as an installation position of the key unit using character, signs, a still image, or a moving image.

In the aspect, the radio wave intensity in the radio communication may be considered to be equal to or greater than the predetermined intensity when the radio communication is possible. In this way, simple determination is also possible. In this case, since it is not necessary to actually determine whether the radio wave intensity is equal to or greater than the predetermined intensity, it is possible to simplify processing.

In the aspect, the radio wave intensity in the radio communication may be considered to be less than the predetermined intensity when there is noise interfering with the radio communication. When the key unit is installed at a position which is affected by noise, communication quality deteriorates and, in some embodiments, that the key unit is not installed at such a position. In this case, since the radio wave intensity in the radio communication is considered to be less than the predetermined intensity, the key unit cannot be located at such a position. When an intensity of noise interfering with the radio communication exceeds an allowable range, it may be determined that there is noise interfering with the radio communication.

A locking/unlocking system according to a second aspect of the disclosure includes: the key unit according to the above-mentioned aspect, a mobile terminal, and a locking/unlocking device. The mobile terminal is configured to notify a user that the key unit is located at a position in the object to be locked or unlocked which is appropriate for installing the key unit when the predetermined signal is a signal corresponding to the fact that the radio wave intensity in the radio communication with the locking/unlocking device is equal to or greater than the predetermined intensity, and is configured to notify the user that the key unit is located at a position in the object which is not appropriate for installing the key unit when the predetermined signal is a signal corresponding to the fact that the radio wave intensity in the radio communication with the locking/unlocking device is less than the predetermined intensity.

In the aspect, the key unit may be configured to transmit a signal corresponding to whether the radio wave intensity has increased with a movement of the key unit to the mobile terminal, and the mobile terminal may be configured to notify the user of whether the radio wave intensity has increased with the movement of the key unit. By causing the mobile terminal to receive such a notification and to notify the user, the user can understand a position at which the radio wave intensity is higher in the object.

In the aspect, the object may be a vehicle, the locking/unlocking device may include a door lock of the vehicle, and the key unit may transmit the predetermined signal inside the vehicle. By installing the key unit inside the vehicle, it is possible to prevent the key unit from being damaged or stolen. Since the user can determine a position which is appropriate for installing the key unit inside the vehicle based on the notification from the mobile terminal, it is possible to install the key unit at a more appropriate position.

A third aspect of the disclosure provides a computer-readable storage medium having a program stored therein. The program causes a computer to perform: determining whether a radio wave intensity in radio communication between a locking/unlocking device locking and unlocking an object and a key unit controlling locking and unlocking of the object is equal to or greater than a predetermined intensity; and transmitting a predetermined signal corresponding to whether the radio wave intensity is equal to or greater than the predetermined intensity.

According to the disclosure, if is possible to rapidly find a position which is appropriate as an installation position of a key unit that controls locking and unlocking of an object.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flow diagram illustrating a flow of data and processes between elements when it is displayed whether a moving direction of the key unit is correct.

DETAILED DESCRIPTION OF EMBODIMENTS

Hereinafter, embodiments of the disclosure will be described with reference to the accompanying drawings. Dimensions, materials, shapes, relative arrangements, and the like of elements described in the embodiments are not intended to limit the scope of the present disclosure unless mentioned otherwise.

Embodiment

Outline of System

Figure 1:
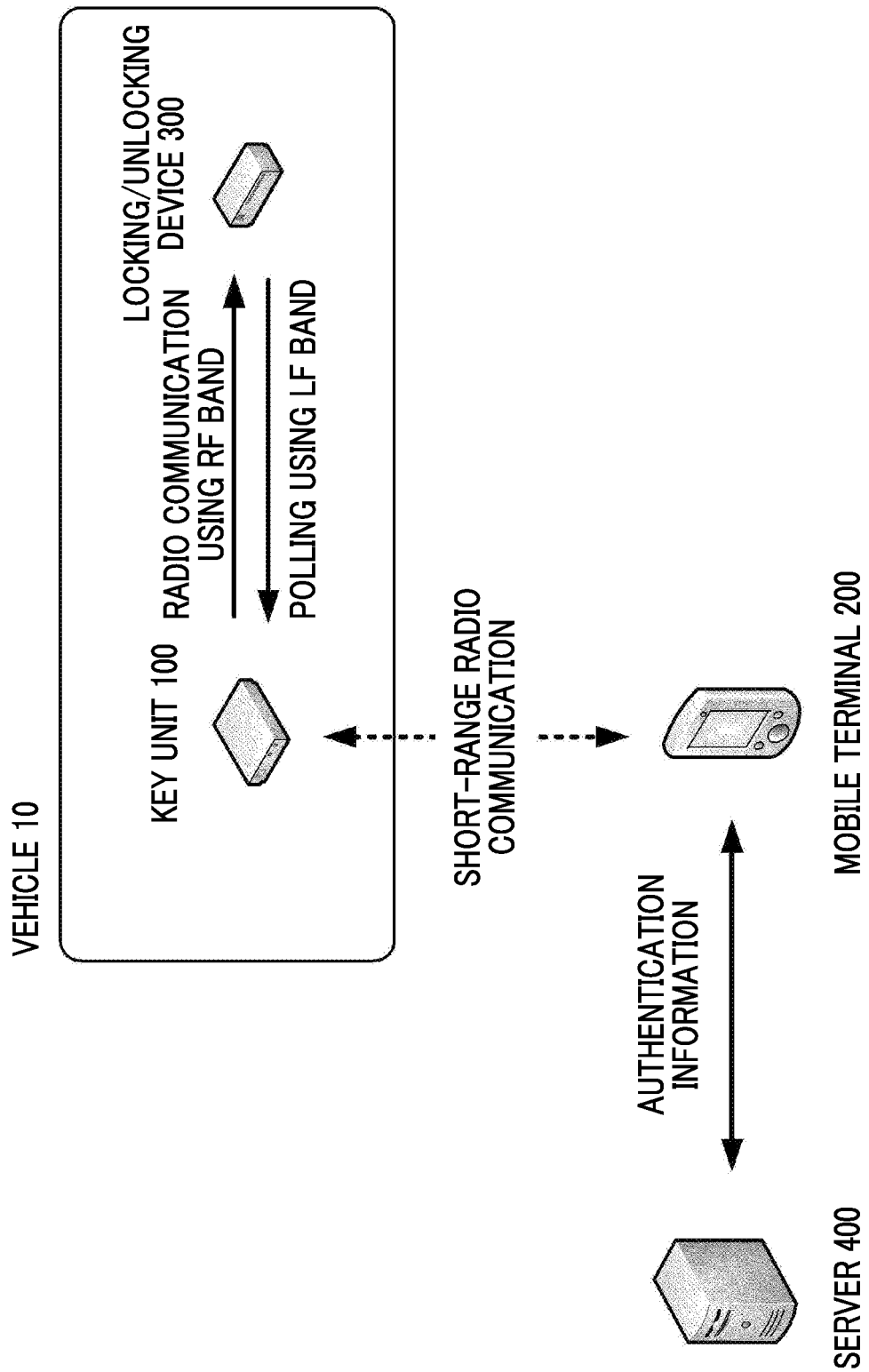
FIG. 1 is a schematic system diagram illustrating a locking/unlocking system according to an embodiment.

The outline of a locking/unlocking system according to an embodiment will be described below with reference to FIG. 1. The locking/unlocking system according to this embodiment includes a key unit 100 and a locking/unlocking device 300 that are mounted in a vehicle, a mobile terminal 200, and a server 400. In the locking/unlocking system according to this embodiment, the key unit 100 includes the same radio interface as an electronic key (a portable unit) such as a smart key and can control locking and unlocking of the vehicle without a physical key being used by communicating with the existing locking/unlocking device 300. The key unit 100 performs short-range radio communication with the mobile terminal 200 and determines whether the key unit operates as an electronic key of the vehicle 10 based on a result of authentication of the mobile terminal 200. That is, a user of the system can lock and unlock the vehicle by operating the mobile terminal 200 from outside of the vehicle 10.

System Configuration

Figure 2:
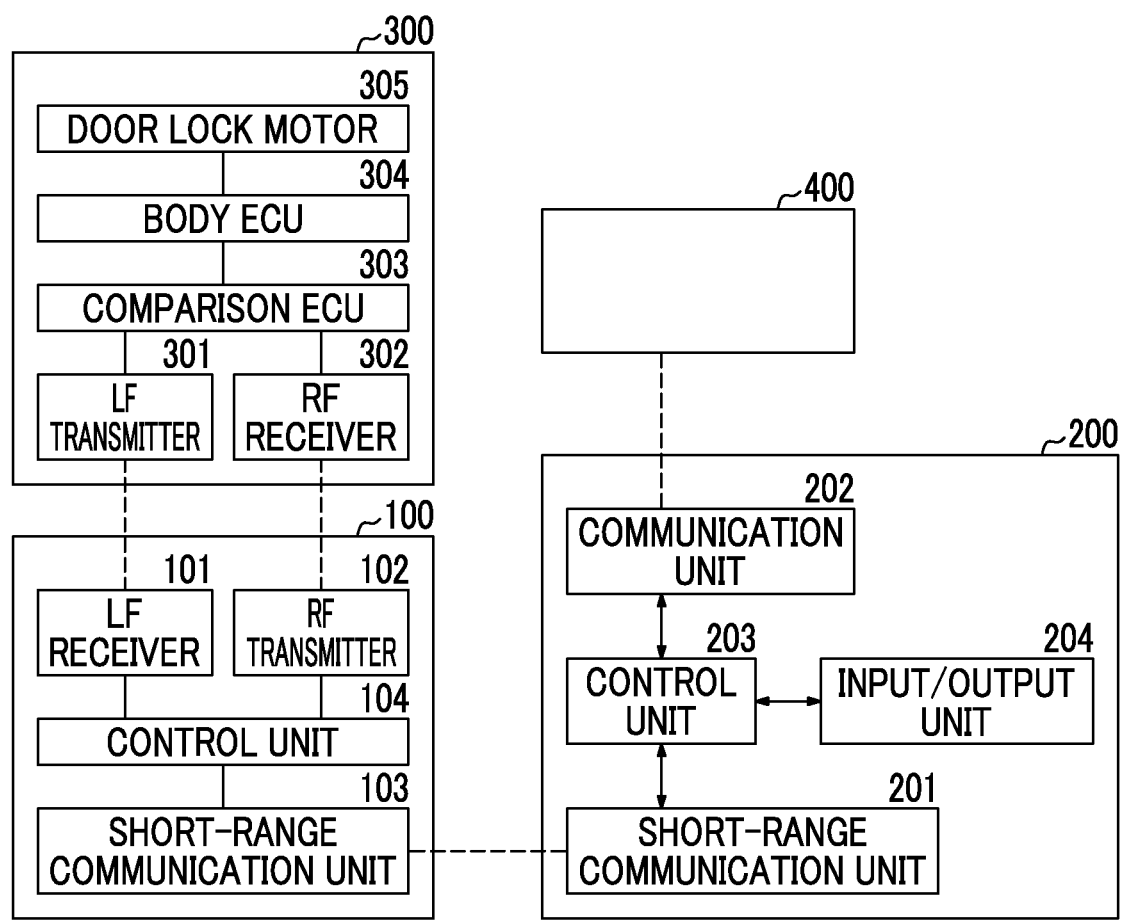
FIG. 2 is a block diagram schematically illustrating an example of elements of the locking/unlocking system.

Elements of the system will be described below in detail. FIG. 2 is a block diagram schematically illustrating an example of configurations of the key unit 100, the mobile terminal 200, the locking/unlocking device 300, and the server 490 which are illustrated in FIG. 1. Among these, the key unit 100 and the locking/unlocking device 300 are mounted in the vehicle 10 which is to be locked/unlocked (locked and unlocked).

The locking/unlocking device 300 is a device that locks and unlocks a door of the vehicle 10 and is an existing device that constitutes a part of a smart key system. Specifically, the locking/unlocking device 300 locks and unlocks a door of the vehicle 10 based on a locking signal and an unlocking signal which are transmitted from an electronic key (hereinafter referred to as a portable unit) carried by a user of the vehicle 10 using radio waves of a radio frequency (hereinafter abbreviated to RF) band. The locking/unlocking device 300 also has a function of transmitting radio waves of a low frequency (hereinafter abbreviated to LF) band for searching for the portable unit.

In this embodiment, instead of the portable unit earned by the user, the key unit 100 controls locking and unlocking of the door of the vehicle 10 by transmitting and receiving radio waves of the RF band and radio waves of the LF band. In the following description, a communication partner of the locking/unlocking device 300 is limited to the key unit 100 unless mentioned otherwise.

The locking/unlocking device 300 includes an LF transmitter 301, an RF receiver 302, a comparison ECU 303, a body ECU 304, and a door lock motor 305. The locking/unlocking device 300 operates with electric power which is supplied from an auxiliary machine battery which is not illustrated and which is mounted in the vehicle 10.

The LF transmitter 301 transmits radio waves of an LF band (which is a first frequency band in the claims, for example, 100 KHz to 300 KHz) for searching for (polling) the key unit 100. The LF transmitter 301 is incorporated, for example, in the vicinity of a center console or a steering wheel inside the vehicle.

The RF receiver 302 receives radio waves of an RF band (which is a second frequency band in the claims, for example, 100 MHz to 1 GHz) transmitted from the key unit 100. The RF receiver 302 is incorporated inside the vehicle, The comparison ECU 303 is a computer that performs control for locking and unlocking the door of the vehicle 10 based on a signal (a locking signal or an unlocking signal) transmitted from the key unit 100 using the radio waves of the RF band. The comparison ECU 303 is constituted, for example, by a microcomputer. In the following description, the locking signal and the unlocking signal are generically referred to as a locking/unlocking signal. The term "locking/unlocking signal" denotes at least one of the locking signal and the unlocking signal.

Figure 3:
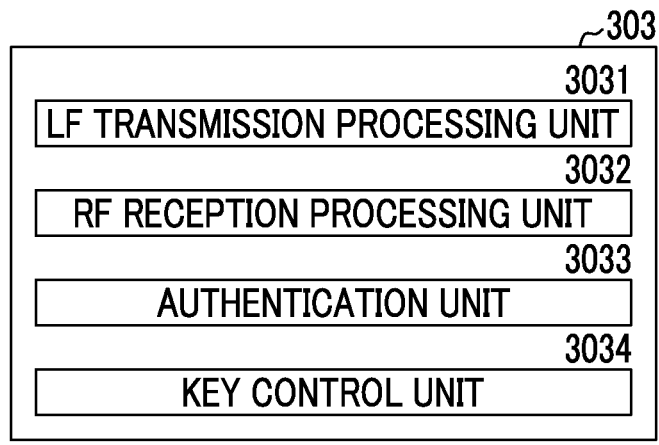
FIG. 3 is a diagram illustrating a functional module winch is included in a comparison ECU.

Functional modules included in the comparison ECU 303 are illustrated in FIG. 3. The functional modules illustrated in FIG. 3 may be embodied by causing a CPU (not illustrated) to execute a program which is stored in a storage unit (such as a ROM) (not illustrated).

An LF transmission processing unit 3031 performs control for transmitting a polling signal as radio waves of the LF band to the inside of the vehicle via the LF transmitter 301. An RF reception processing unit 3032 performs control for receiving a locking/unlocking signal transmitted as radio waves of the RF band from the key unit 100 via the RF receiver 302. An authentication unit 3033 ascertains whether the locking/unlocking signal transmitted from the key unit 100 has been transmitted from a proper device. Specifically, the authentication unit 3033 determines whether a key ID included in the locking/unlocking signal matches a key ID stored in advance in a storage unit (not illustrated) of the comparison ECU 303. Specific details thereof will be described later.

A key control unit 3034 transmits an unlocking command or a locking command to a body ECU 304 which will be described later based on a result of authentication which is performed by the authentication unit 3033. The signal is transmitted via an onboard network such as a controller area network (CAN).

The body ECU 304 is a computer that controls the body of the vehicle 10. The body ECU 304 has a function of unlocking and locking the door of the vehicle 10 by controlling the door lock motor 305 which will be described later based or the received unlocking command or locking command. The body ECU 304 may additionally have functions of performing control of elements associated with the vehicle body such as power window control, seat adjustment, antitheft, seat belt control, and headlamp control.

The door lock motor 305 is an actuator that locks and unlocks the door of the vehicle 10 (which includes a trunk in addition to an entrance/exit door and a rear gate). The door lock motor 305 operates based on a signal transmitted from the body ECU 304.

The key control unit 3034 may transmit only information indicating that authentication has succeeded to the body ECU 304 instead of the unlocking command or the locking command. According to this configuration, a locking or unlocking operation can be performed with an action of a user (for example, pushing of an unlocking button or a touch of a door knob) as a trigger.

The key unit 100 will be described next. The key unit 100 is a device that is disposed inside the vehicle 10 and has a function of authenticating the mobile terminal 200 by performing short-range radio communication with the mobile-terminal 200, a function of transmitting a locking/unlocking signal using the radio waves of the RF band based on the result authentication of the mobile terminal 200, a function of determining an installation position of the key unit 100 based on a radio wave intensity when radio communication has been performed with the locking/unlocking device 300, and a function of transmitting a result of determination to the mobile terminal 200. The key unit 100 includes an LF receiver 101, an RF transmitter 102, a short-range communication unit 103, and a control unit 104. The key unit 100 may be installed in a trunk of the vehicle 10, but when the key unit 100 is installed in the trunk of the vehicle 10, there is a concern that luggage will come into contact with the key unit 100 and break the key unit 100 when luggage is put in and taken out of the trunk. When the key unit 100 is installed in the trunk, there is a concern that the key unit 100 will be stolen. In some embodiments, the key unit 100 is installed in the interior of the vehicle 10. The installation position of the key unit 100 in this embodiment will be described later. The key unit 100 operates with electric power which is supplied from an auxiliary machine battery which is not illustrated and which is mounted in the vehicle 10.

The LF receiver 101 receives a polling signal transmitted from the locking/unlocking device 300 using radio waves of the LF band. The LF receiver 101 includes an antenna for receiving radio waves of the LF band (hereinafter referred to as an LF antenna). The LF antenna is, for example, a three-axis antenna, but the LF antenna may be a uniaxial antenna.

The RF transmitter 102 transmits a locking/unlocking signal to the locking/unlocking device 300 using radio waves of the RF band.

The short-range communication unit 183 communicates with the mobile terminal 200 carried by the user. The short-range communication unit 103 performs communication in a short range (at a distance at which the interior and the exterior of the vehicle can communicate with each other) using a predetermined radio communication standard.

In this embodiment, the short-range communication unit 103 performs data communication based on a Bluetooth (registered trademark) low energy standard (hereinafter referred to as BLE). BLE is a low-energy communication standard using Bluetooth, and is characterized in that communication can be started immediately when a communication partner is detected without requiring pairing between devices. In this embodiment, BLE is exemplified, but another radio communication standard can also be used. For example, near field communication (NFC), ultra wideband (UWB), or WiFi (registered trademark) may be used.

The control unit 104 is a computer that performs short-range radio communication with the mobile terminal 200 via the short-range communication unit 103 and performs control for authenticating the mobile terminal 200, control for transmitting a locking/unlocking signal based on the authentication result, control for measuring a radio wave intensity of a polling signal received by the LF receiver 101, control for performing determination of an installation position of the key unit 100 based on the measured radio wave intensity, and control for transmitting a result of determination of the installation position to the mobile terminal 200. The control unit 104 is constituted, for example, by a microcomputer.

Figure 4:
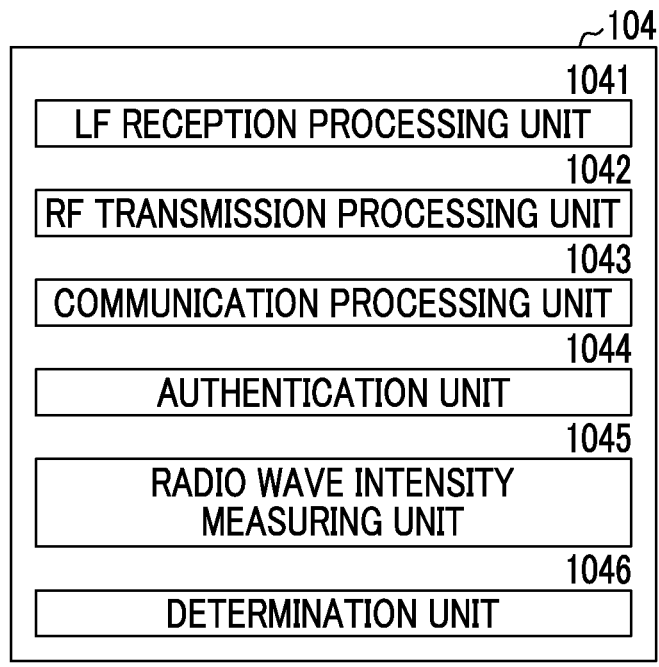
FIG. 4 is a diagram illustrating a functional module which is included in a control unit.

Functional modules included in the control unit 104 are illustrated in FIG. 4. The functional modules illustrated in FIG. 4 may be embodied by causing a CPU (not illustrated) to execute a program stored in a storage unit (such as a ROM) (not illustrated).

An LF reception processing unit 1041 performs control for receiving a polling signal transmitted as radio waves of the LF band from the locking/unlocking device 300 via the LF receiver 101. An RF transmission processing unit 1042 performs control for transmitting a locking/unlocking signal as radio waves of the RF band via the RF transmitter 102. The locking/unlocking signal is generated by a communication processing unit 1043 which will be described later when an authentication unit 1044 which will be described later succeeds in authentication of the mobile terminal 200.

The communication processing unit 1043 processes communication with the mobile terminal 200 via the short-range communication unit 103. Specifically the communication processing unit 1043 receives a locking request or an unlocking request (hereinafter generically referred to as a locking/unlocking request) from the mobile terminal 200 and generates a locking/unlocking signal in response to the received request. The generated locking/unlocking signal is temporarily stored and is output at a time at which the authentication unit 1044 which will be described later succeeds in authentication of the mobile terminal 200. The communication processing unit 1043 receives a result of determination from a determination unit 1046 which will be described later and generates a determination result signal based on the result of determination. Here, the generated determination result signal is output via the short-range communication unit 103.

The authentication unit 1044 authenticates the mobile terminal 200 based on authentication information included in a locking/unlocking request transmitted from the mobile terminal 200. Specifically, the authentication unit 1044 compares the authentication information transmitted from the mobile terminal 200 with authentication information stored in a storage unit which is not illustrated and determines that the authentication has succeeded when they match. When the authentication information does not match, the authentication unit 1044 determines that the authentication has failed. When the authentication of the mobile terminal 200 by the authentication unit 1044 succeeds, a locking/unlocking signal generated by the communication processing unit 1043 is output to the RF transmission processing unit 1042 and is wirelessly transmitted to the locking/unlocking device 300. The method of authentication performed by the authentication unit 1044 may be a method of simply comparing authentication information and verifying identity therebetween or may be a method using an asymmetric cipher. In the following description, the authentication information stored in the key unit 100 is referred to as device authentication information and the authentication information transmitted from the mobile terminal 200 is referred to as terminal authentication information.

The key unit 100 transmits an ID of an electronic key (hereinafter referred to as a key ID) along with a locking/unlocking signal to the locking/unlocking device 300. The key ID may be stored in the key unit 100 in a plaintext state in advance or may be stored in a state in which it is encrypted using a cypher specific to the mobile terminal 290. When the key ID is stored in the encrypted state, the encrypted key ID may be decrypted using authentication information transmitted from the mobile terminal 200 to acquire the original key ID.

A radio wave intensity measuring unit 1045 measures a radio wave intensity of a polling signal received by the LF receiver 101. An existing circuit and an existing calculation expression can be used for the measurement. In this embodiment, since the installation position of the key unit 100 is determined based on the radio wave intensity in the LF band which is markedly affected by noise, the radio wave intensity measuring unit 1045 measures the radio wave intensity of the polling signal.

The determination unit 1046 determines whether the radio wave intensify of the polling signal measured by the radio wave intensity measuring unit 1045 is equal to or greater than a predetermined intensity. This predetermined intensity is a radio wave intensify with which minimum communication quality can be secured in spite of an influence of noise. The predetermined intensity may be set to a lower limit value of the radio wave intensity with which communication between the key unit 100 and the locking/unlocking device 300 is possible or may be set to a radio wave intensity obtained by adding a certain margin to the lower limit value. The determination unit 1046 determines whether the radio wave intensity of the polling signal measured by the radio wave intensity measuring unit 1045 is equal to or greater than the predetermined intensity, and the communication processing unit 1043 generates a determination result signal based on the result of determination.

The mobile terminal 200 will be described next. The mobile terminal 200 is a small computer such as a smartphone, a mobile phone, a tablet terminal, a personal digital assistant (PDA), a wearable computer (such as a smart watch), or a portable diagnosis device for a vehicle 10. The mobile terminal 200 includes a short-range communication unit 201, a communication unit 202, a control unit 203, and an input/output unit 204.

The short-range communication unit 201 performs communication with the key unit 100 based on the same communication standard as the short-range communication unit 103. The communication unit 202 connects the mobile terminal 200 to a network. In this embodiment, the mobile terminal can communicate with another device (for example, the server 400) via a network using a mobile communication service such as 3G or LTE.

The control unit 203 is a computer that takes charge of control of the mobile terminal 200. The control unit 203 performs, for example, a process of generating a locking/unlocking request, a process of acquiring the terminal authentication information, and a process of transmitting the looking/unlocking request and the terminal authentication information to the key unit 100. The control unit 203 is constituted, for example, by a microcomputer. The control unit 203 may embody such functions by causing a CPU (not illustrated) to execute a program stored in a storage unit (such as a ROM) (not illustrated).

The control unit 203 performs an interaction with the user via the input/output unit 204. The input/output unit 204 receives an input operation from the user and presents information to the user. Specifically, the input/output unit 204 includes a touch panel and a control unit thereof and a liquid crystal display and a control unit thereof. The touch panel and the liquid crystal display are embodied as a single touch panel display in this embodiment.

The control unit 203 displays an operation screen on the input/output unit 204 and generates an unlocking request or a locking request in accordance with an operation which is performed by the user. For example, the control unit 203 outputs an icon for unlocking, an icon for locking, and the like on the touch panel display and generates an unlocking request or a locking request based on the operation which is performed by the user. The operation which is performed by the user is not limited to an operation on the touch panel display. For example, a hardware switch may be used. The control unit 203 displays an image based on the determination result signal received by the short-range communication unit 201 on the touch panel display.

The control unit 203 performs a process of acquiring terminal authentication information. In this embodiment, the terminal authentication information is generated by the server 400 and is transmitted to the mobile terminal 200 via the communication unit 202. When the user of the mobile terminal 200 performs an operation of unlocking the vehicle 10 via the input/output unit 204, the mobile terminal 200 transmits an unlocking request and the terminal authentication information to the server 400. The terminal authentication information is not information for the locking/unlocking device 300 to authenticate the key unit 100, but is information which is used for the key unit 100 to authenticate the mobile terminal 200. When the mobile terminal 200 transmits information for identifying the mobile terminal to the server 400, the server 400 acquires terminal authentication information specific to the mobile terminal 200 and transmits the acquired terminal authentication information to the mobile terminal 200. The terminal authentication information acquired by the mobile terminal 200 may be an invariable key or a one-time key. In any case, device authentication information corresponding to the terminal authentication information is stored in the key unit 100 in advance. Accordingly, an operation of unlocking the vehicle 10 can be performed using the mobile terminal 200.

Outline of Locking/Unlocking Device

The locking/unlocking device 300 is a device that constitutes a smart key system in the related art and detects that a portable unit is located in the vicinity of the vehicle or in the interior by communicating with a portable unit carried by the user. As described above, in this embodiment, the key unit 100 serves as a portable unit Specifically, the comparison ECU 303 transmits a polling signal to the interior and exterior of the vehicle via the LF transmitter 301 at predetermined time intervals, and receives a response signal transmitted from the key unit 100 in response to the polling signal. The response signal includes a key ID specific to the key unit 100, the registered key ID of the key unit 100 is stored in the comparison ECU 303, and the comparison ECU 303 compares the received key ID with the stored key ID to perform a process of authenticating the key unit 100. When authentication of the key unit 100 succeeds, a notification indicating this fact is transmitted to the body ECU 304 and thus the vehicle can be made to perform a predetermined operation (for example, unlocking of a door or releasing of an immobilizer).

In a case of locking, the same process is performed. When the user of the mobile terminal 200 performs an operation of locking the vehicle 10 via the touch panel display, the mobile terminal 200 transmits a locking request and terminal authentication information to the server 400. The key unit 100 compares the terminal authentication information transmitted from the mobile terminal 200 with the device authentication information stored in advance to perform an authentication process. When the authentication succeeds, the key unit 100 transmits a locking signal and the key ID to the locking/unlocking device 300. The locking/unlocking device 300 performs an authentication process based on the received key ID. As a result, when the authentication succeeds, the door of the vehicle 10 is locked.

A problem in installation of the key unit 100 will be described below. As described above, the key unit 100 performs radio communication with the locking/unlocking device 300 using the LF receiver 101 and the RF transmitter 102. Here, for example, a device serving as a noise source such as a wiper, an air conditioner, or an ETC (registered trademark) onboard unit is mounted in the vehicle 16. Some noise generated from such devices may interfere with a communication signal between the key unit 108 and the locking/unlocking device 300. Particularly, radio waves received by the LF receiver 101 are likely to be affected by noise. Accordingly, a polling signal may not be correctly received due to an influence of such noise.

It may be conceived that a uniaxial antenna is used to reduce an influence of noise on a polling signal. However, when a uniaxial antenna, is used, a range in which radio waves can be received is narrowed. When the key unit 100 departs from the range, a radio wave intensity of a polling signal is markedly decreased. Accordingly, there is a concern that a polling signal will not be correctly received.

In any case, when the radio wave intensity of a polling signal received by the LF receiver 101 is sufficiently high, it is possible to secure sufficient communication quality in spite of presence of noise. However, it may take time for a user to find a position at which the radio wave intensity is sufficiently high and the key unit 100 can be installed.

On the other hand, the key unit 100 measures the radio wave intensity of a polling signal received by the LF receiver 101 and determines whether the radio wave intensity is equal to or greater than a predetermined intensity. Then, the key unit 100 generates a determination result signal based on the result of determination and transmits the determination result signal to the mobile terminal 200. The mobile terminal 200 notifies the user of whether the key unit 100 can be installed by displaying an image or the like based on the determination result signal on the touch panel display.

Several patterns are conceivable for the determination result signal transmitted from the key unit 100 to the mobile terminal 200. For example, in one pattern, a signal indicating that the radio wave intensity is equal to or greater than the predetermined intensity may be transmitted when the radio wave intensity is equal to or greater than the predetermined intensity, and a signal indicating that the radio wave intensity is less than the predetermined intensity may be transmitted when the radio wave intensity is less than the predetermined intensity. In this case, in the mobile terminal 200, the control unit 203 displays an image corresponding to whether the key unit 100 can be installed on the touch panel display which is the input/output unit 204. For example, when the determination result signal indicating that the radio wave intensity of a polling signal is equal to or greater than the predetermined intensity is received by the short-range communication unit 201 of the mobile terminal 200, information indicating that it is a position which is suitable for installing the key unit 100 is displayed on the touch panel display of the mobile terminal 200. On the other hand, when the determination result signal indicating that the radio wave intensity of a polling signal is less than the predetermined intensity is received by the short-range communication unit 201 of the mobile terminal 200, information indicating that it is not a position which is suitable for installing the key unit 100 is displayed on the touch panel display of the mobile terminal 200.

Instead of information indicating whether it is a position suitable for installing the key-unit 100, information indicating whether the radio wave intensity of a polling signal is equal to or greater than a predetermined intensity may be displayed on the touch panel display of the mobile terminal 200. That is, when the determination result signal indicating that the radio wave intensity of a polling signal is equal to or greater than the predetermined intensity is received by the short-range communication unit 201 of the mobile terminal 200, information indicating that the radio wave intensity of a polling signal is equal to or greater than the predetermined intensity may be displayed on the touch panel display of the mobile terminal 200. On the other hand, when the determination result signal indicating that the radio wave intensity of a polling signal is less than the predetermined intensity is received by the short-range communication unit 201 of the mobile terminal 200, information indicating that the radio wave intensity of a polling signal is less than the predetermined intensity may be displayed on the touch panel display of the mobile terminal 200.

In another example, when the radio wave intensity is equal to or greater than the predetermined intensity, the determination result signal indicating this fact may be transmitted from the key unit 100, but when the radio wave intensity is less than the predetermined intensity, the determination result signal indicating this fact may not be transmitted. In this case, when the determination result signal indicating that the radio wave intensity of a polling signal is equal to or greater than the predetermined intensity is received by the short-range communication unit 201 of the mobile terminal 200, information indicating that it is a position suitable for installing the key unit 100 is displayed on the touch panel display of the mobile terminal 200. On the other hand, until the determination result signal indicating that the radio wave intensity of a polling signal is equal to or greater than the predetermined intensity is received by the short-range communication unit 201 of the mobile terminal 200, information indicating that it is a position not suitable for installing the key unit 100 is displayed on the touch panel display of the mobile terminal 200.

Figure 5:
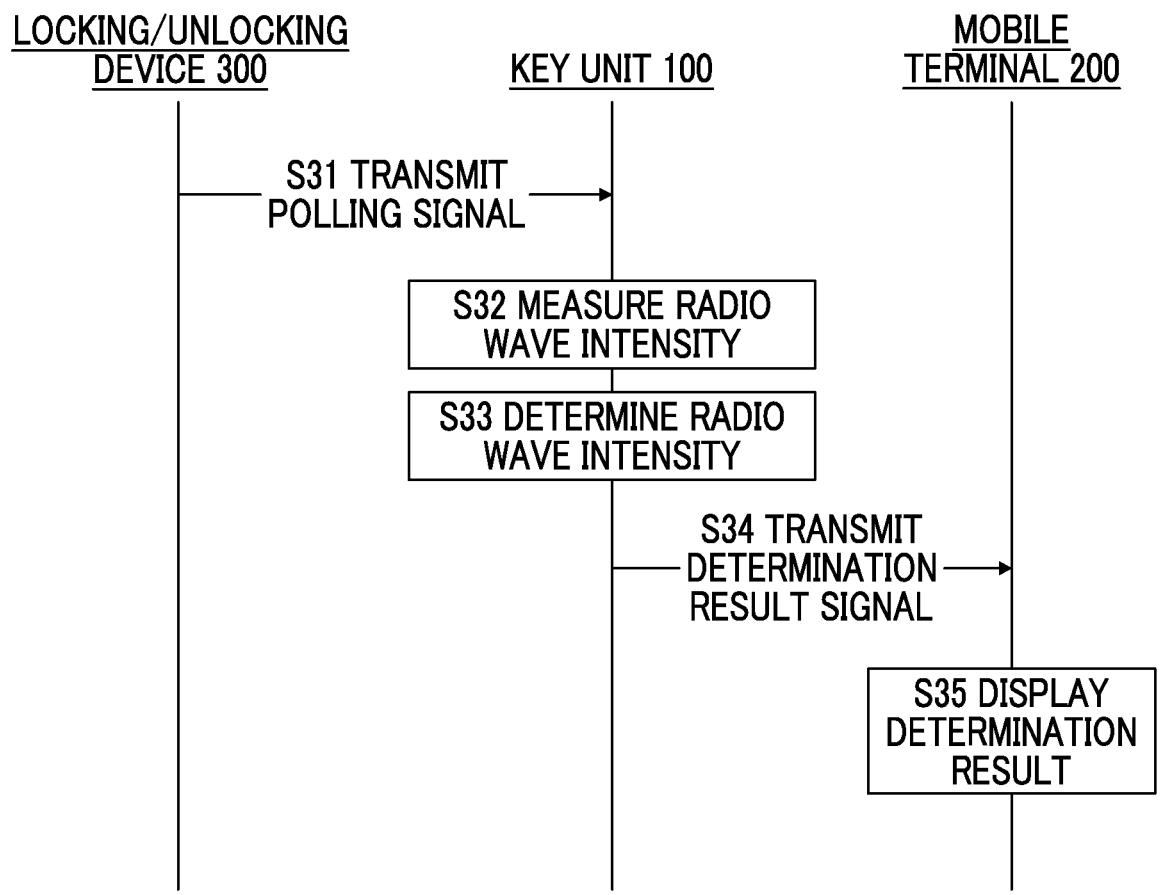
FIG. 5 is a flow diagram illustrating a flow of data and processes between elements when a key unit is installed.

An operation of the locking/unlocking system when the key unit 100 is installed according to this embodiment will be described below with reference to FIG. 5. FIG. 5 is a flow diagram illustrating a flow of data which is transmitted and received between the elements and processes which are performed by the elements. This routine is started when the user of the mobile terminal 200 performs an operation of finding an installation position of the key unit 100 via the touch panel display. This operation includes, for example, with the user's touch of an icon displayed on the touch panel display.

First in Step S31, the locking/unlocking device 300 transmits a polling signal to the key unit 100. Since the polling signal is transmitted from the locking/unlocking device 300 at constant time intervals, the key unit 100 receives the polling signal. The key unit 100 measures the radio wave intensity of the polling signal in Step S32, and the key unit 100 determines whether the radio wave intensity of the polling signal is equal to or greater than a predetermined intensity in Step S33. The key unit 100 transmits a determination result signal to the mobile terminal 200 in Step S34, and the mobile terminal 200 displays an image corresponding to the determination result signal as a result of determination of the installation position of the key unit 100 on the touch panel display in Step S35. At this time, when information indicating that it is not suitable as the installation position of the key unit 100 is displayed on the touch panel display of the mobile terminal 200, the user moves the key unit 100 and then starts the routine illustrated in FIG. 5. In this way, until a position which is suitable as the installation position of the key unit 100 is found, the operations of causing the user to move the position of the key unit 100 and then performing the routine illustrated in FIG. 5 are repeated.

The determination unit 1046 may store the radio wave intensity of the polling signal which was measured in the past and may cause the communication processing unit 1043 to generate a signal indicating whether the radio wave intensity of the polling signal has increased from the past measured value after the key unit 100 is moved. The signal generated in this way is output as a determination result signal via the short-range communication unit 103. When this signal is received by the short-range communication unit 201 of the mobile terminal 200, the control unit 203 displays information indicating whether the radio wave intensity has increased or decreased on the touch panel display of the mobile terminal 200. The control unit 203 may display information indicating that the moving direction of the key unit 100 is correct on the touch panel display of the mobile terminal 200 when the radio wave intensity has increased, and may display information indicating that the moving direction of the key unit 100 is not correct on the touch panel display of the mobile terminal 200 when the radio wave intensity has decreased. The user can find a position at which the radio wave intensity of the polling signal increases by moving the key unit 100 based on the information indicating whether the radio wave intensity has increased or information indicating whether the moving direction of the key unit 100 is correct which is displayed on the touch panel display of the mobile terminal 200. Accordingly, it is possible to more rapidly find a position at which the radio wave intensity is equal to or greater than a predetermined intensity and to find a position at which the radio wave intensity is greater among positions at which the radio wave intensity becomes the predetermined intensity. The radio wave intensity of the polling signal which was measured in the past is stored in a memory which is not illustrated in the key unit 100. The polling signal which was measured in the past may be a polling signal which was measured in the last time or may be a polling signal which was measured in the last time before a predetermined number of times or before a predetermined time. Data of the radio wave intensity used once tor comparison may be deleted from the memory.

An operation of the locking/unlocking system when information indicating whether the moving direction of the key unit 100 is correct is displayed according to this embodiment will be described below with reference to FIG. 6. FIG. 6 is a flow diagram illustrating a flow of data which is transmitted and received between the elements and processes which are performed by the elements. This routine is started when the user of the mobile terminal 200 performs an operation of finding the installation position of the key unit 100 via the touch panel display. This operation includes, for example, a touch of the user with an icon displayed on the touch panel display. The same processes as in the flow illustrated in FIG. 5 will be referred to by the same reference signs and description thereof will not be repeated.

After the key unit 100 transmits the determination result signal to the mobile terminal 200 in Step S34, the key unit 100 stores the radio wave intensity in Step S41. When the radio wave intensity has been measured in Step S32, the radio wave intensity may be stored before Step S34. Then, in Step S42, the key unit 100 compares the radio wave intensity stored in Step S41 when the flow illustrated in FIG. 6 was performed in the past (the radio wave intensity measured and stored in the past) with the radio wave intensity stored in Step S41 in this time and determines whether the radio wave intensity has increased. The result of comparison is transmitted from the key unit 100 to the mobile terminal 290 in the next Step S41. In Step S44, the mobile terminal 200 displays information indicating whether the radio wave intensity has increased or whether the moving direction of the key unit 100 is correct on tire touch panel display. That is, the mobile terminal 200 displays information indicating that the radio wave intensity has increased or that the moving direction is correct on the touch panel display when a signal indicating that the radio wave intensity has increased is received by the mobile terminal 200, and the mobile terminal 200 displays information indicating that the radio wave intensity bas decreased or that the moving direction is not correct on the touch panel display when a signal indicating that the radio wave intensity has decreased is received by the mobile terminal 200. The user can more rapidly find a position at which the radio wave intensity is greater by moving the key unit 100 while watching a display of the touch panel display.

When noise is received by the LF receiver 101, the determination unit 1046 may consider that the radio wave intensity of the polling signal is less than the predetermined intensity. That is, when noise is received by the LF receiver 101, the determination unit 1046 causes the communication processing unit 1043 to generate a signal indicating that a current position is not suitable as the installation position of the key unit 100 and to output the generated signal via the short-range communication unit 103. When this signal is received by the short-range communication unit 201 of the mobile terminal 200, the control unit 203 displays information indicating that the current position is not suitable as the installation position of the key unit 100 on the touch panel display. In this way, by preventing the key unit 100 from being installed at a position at which noise is received, it is possible to avoid an influence of noise and to simplify the processes. A threshold value of the intensity of noise may be provided and the radio wave intensity of the polling signal may be considered to be less than the predetermined intensity when noise with an intensity equal to or greater than the threshold value is received. The threshold value is set so that the communication quality of the polling signal is in an allowable range. The intensity of noise is measured by the radio wave intensity measuring unit 1045. For example, the intensity of noise is measured in Step S32 of FIG. 5, and the key unit 100 considers that the radio wave intensity of the polling signal is less than the predetermined intensity in Step S33 when the intensity of noise measured in Step S32 is equal to or greater than the threshold value or when noise is measured in Step S32.

When the key unit 100 can receive a polling signal from the locking/unlocking device 300, that is, when radio communication between the key unit 100 and the locking/unlocking device 300 is possible, the determination unit 1046 may consider that the radio wave intensity of the polling signal is equal to or greater than the predetermined intensity. When the polling signal is received by the LF receiver 101, the determination unit 1046 causes the communication processing unit 1043 to generate a signal indicating that a current position is suitable as the installation position of the key unit 100 and to output the generated signal via the short-range communication unit 103. When this signal is received by the short-range communication unit 201 of the mobile terminal 200, the control unit 203 displays information indicating that the current position is suitable as the installation position of the key unit 100 on the touch panel display. In this way, by installing the key unit 100 at a position at which the polling signal is received, it is possible to simplify the processes. For example, when the polling signal is received in Step S32 of FIG. 5, the key unit 100 considers that the radio wave intensity of the polling signal is equal to or greater than the predetermined intensity in Step S33.

When the determination Unit 1046 determines whether the radio wave intensity of the polling signal is equal to or greater than the predetermined intensity, the radio wave intensity of the polling signal or the predetermined intensity may be corrected depending on the intensity of noise interfering with the polling signal. That is, the radio wave intensity may be corrected so that the radio wave intensity decreases by the intensity of noise or the predetermined intensity may be corrected so that the predetermined intensity increases by the intensity of noise. By employing this configuration, it is possible to determine whether the key unit 100 can be installed in consideration of an influence of actual noise.

In this embodiment, it is determined whether the key unit 100 can be installed based on the radio wave intensity of a polling signal, but it may be determined whether the key unit 100 can be installed based on intensities of other radio waves which are used for communication between the key unit 100 and the locking/unlocking device 300.

In this embodiment, the locking/unlocking device 300 and the key unit 100 are used for locking and unlocking of the vehicle 10, but they may be used for locking and unlocking of a facility (a facility such as a conference room, a resort house, or a gymnasium) which is used at different times by a plurality of users.

In this embodiment, the position of the key unit 100 has been, described above, but tins "position" may include an angel of the key unit 100. This angle may be an angle of an LF antenna. Here, since the angle of the LF antenna of the key unit 100 with respect to the locking/unlocking device 300 changes by changing an installation angle of the key unit 100, the radio wave intensity of a polling signal may change. Accordingly, it is possible to further enhance the communication quality by finding the installation angle of the key unit 100 at which the radio wave intensify of a polling signal is equal to or greater than a predetermined intensity. In this case, more remarkable effects can be achieved in a uniaxial LF antenna with high directivity.

In this embodiment, the mobile terminal 200 displays an image based on the determination result signal on the touch panel display, but the mobile terminal 200 may emit sound based on the determination result signal instead.

As described above, since the user can determine whether a position is suitable for installing the key unit 100 based on a notification from the mobile terminal 200, the user can more rapidly and more simply find a position which is suitable for installing the key unit 100.

In the above-mentioned embodiment, the key unit 100 performs only locking and unlocking of the vehicle 10, but the key unit 100 may be made to perform an operation other than the locking and unlocking operation. For example, the key unit 100 may start an engine of the vehicle 10 by communicating with a controller that manages the engine. According to this configuration, a conventional portable unit (an electronic key) carried by a user can be replaced with a mobile terminal.

Recording Medium

A program causing a computer or other machine (hereinafter referred to as a computer or tire like) to realize some functions can be recorded on a recording medium which is readable by the computer or the like. By causing the computer or the like to read and execute the program recorded on the recording medium, the functions can be provided.

Here, a recording medium which is readable by a computer or the like refers to a non-transitory recording medium in which information such as data or a program is stored by an electrical, magnetic, optical, mechanical, or chemical operation and can be read by the computer or the like. Examples of a recording medium which can be detached from a computer or the like include a flexible disk, a magneto-optical disc, a CD-ROM, a CD-R/W, a DVD, a Blueray disc, a DAT, a 8 mm tape, and a memory card such as a flash memory. Examples of a recording medium which is fixed to a computer or the like include a hard disk and a read only memory (ROM). A solid state drive (SSD) can be used as a recording medians which can be detached from a computer or the like and can also be used as a recording medium which is fixed to a computer or the like.

What is claimed is:

1. A key unit comprising:
a control unit configured to control locking and unlocking of an object by performing radio communication with a locking/unlocking device,
wherein the key unit is configured to transmit a predetermined signal to a mobile terminal, the predetermined signal corresponding to whether a radio wave intensity in the radio communication with the locking/unlocking device is equal to or greater than a predetermined intensity, the predetermined signal being used to transmit a predetermined notification to a user when the predetermined signal is received by the mobile terminal.

2. The key unit according to claim 1, wherein the predetermined signal is a signal for displaying a predetermined image corresponding to whether the radio wave intensity in the radio communication is equal to or greater than the predetermined intensity on a screen of the mobile terminal.

3. The key unit according to claim 1, wherein the radio wave intensity in the radio communication is considered to be equal to or greater than the predetermined intensity when the radio communication is possible.

4. The key unit according to claim 1, wherein the radio wave intensity in the radio communication is considered to be less than the predetermined intensity when there is noise interfering with the radio communication.

5. A locking/unlocking system comprising:
a mobile terminal;
a locking/unlocking device; and
a key unit that includes a control unit configured to control locking and unlocking of an object by performing radio communication with the locking/unlocking device,
wherein the key unit is configured to transmit a predetermined signal to the mobile terminal, the predetermined signal corresponding to whether a radio wave intensity in the radio communication with the locking/unlocking device is equal to or greater than a predetermined intensity, the predetermined signal being used to transmit a predetermined notification to a user when the predetermined signal is received by the mobile terminal,
wherein the mobile terminal is configured to notify a user that the key unit is located at a position in the object to be locked or unlocked which is appropriate for installing the key unit when the predetermined signal is a signal corresponding to a fact that the radio wave intensity in the radio communication with the locking/unlocking device is equal to or greater than the predetermined intensity, and the mobile terminal is configured to notify the user that the key unit is located at a position in the object which is not appropriate for installing the key unit when the predetermined signal is a signal corresponding to a fact that the radio wave intensity in the radio communication with the locking/unlocking device is less than the predetermined intensity.

6. The locking/unlocking system according to claim 5, wherein the key unit is configured to transmit a signal corresponding to whether the radio wave intensity has increased with a movement of the key unit to the mobile terminal, and
wherein the mobile terminal is configured to notify the user of whether the radio wave intensity has increased with the movement of the key unit.

7. The locking/unlocking system according to claim 5, wherein the object is a vehicle,
wherein the locking/unlocking device includes a door lock of the vehicle, and
wherein the key unit transmits the predetermined signal inside the vehicle.

8. A non-transitory computer-readable storage medium having a program stored therein, the program causing a computer to perform:
determining whether a radio wave intensity in radio communication between a locking/unlocking device locking and unlocking an object and a key unit controlling locking and unlocking of the object is equal to or greater than a predetermined intensity; and
transmitting a predetermined signal to a mobile terminal, the predetermined signal corresponding to whether the radio wave intensity is equal to or greater than the predetermined intensity.

* * * * *

UNITED STATES PATENT AND TRADEMARK OFFICE
CERTIFICATE OF CORRECTION

PATENT NO. : 10,530,501 B2
APPLICATION NO. : 16/108709
DATED : January 7, 2020
INVENTOR(S) : Yasuyuki Tamane, Tsukasa Takahashi and Masaki Oshima It is certified that error appears in the above-identified patent and that said Letters Patent is hereby corrected as shown below:

In the Specification

In Column 1, Line 30, delete "2603-318809" and insert --2003-318809--, therefor.

In Column 1, Line 61, delete "unity" and insert --unit--, therefor.

In Column 4, Line 52, delete "490" and insert --400--, therefor.

In Column 5, Line 23, after "vehicle", delete "," and insert --.--, therefor.

In Column 8, Line 24, delete "intensify" and insert --intensity--, therefor.

In Column 9, Line 48, after "unit", insert --.--.

In Column 10, Line 16, delete "16" and insert --10--, therefor.

In Column 11, Line 57, after "first", insert --,--.

In Column 12, Line 52, delete "tor" and insert --for--, therefor.

In Column 13, Line 16, delete "tire" and insert --the--, therefor.

In Column 13, Line 23, delete "bas" and insert --has--, therefor.

In Column 14, Line 42, delete "been," and insert --been--, therefor.

In Column 14, Line 42, delete "tins" and insert --this--, therefor.

In Column 14, Line 43, delete "angel" and insert --angle--, therefor.

Signed and Sealed this
Twenty-fourth Day of March, 2020

Andrei Iancu
*Director of the United States Patent and Trademark Office*

In Column 14, Line 50, delete "intensify" and insert --intensity--, therefor.

In Column 15, Line 7, delete "tire" and insert --the--, therefor.